April 24, 1945.  W. B. PETERSON, JR  2,374,619
VALVE FOR PRESSURE CHAMBERS
Filed April 24, 1943  3 Sheets-Sheet 1

INVENTOR.
WILLIAM B. PETERSON JR.
BY
ATTORNEY

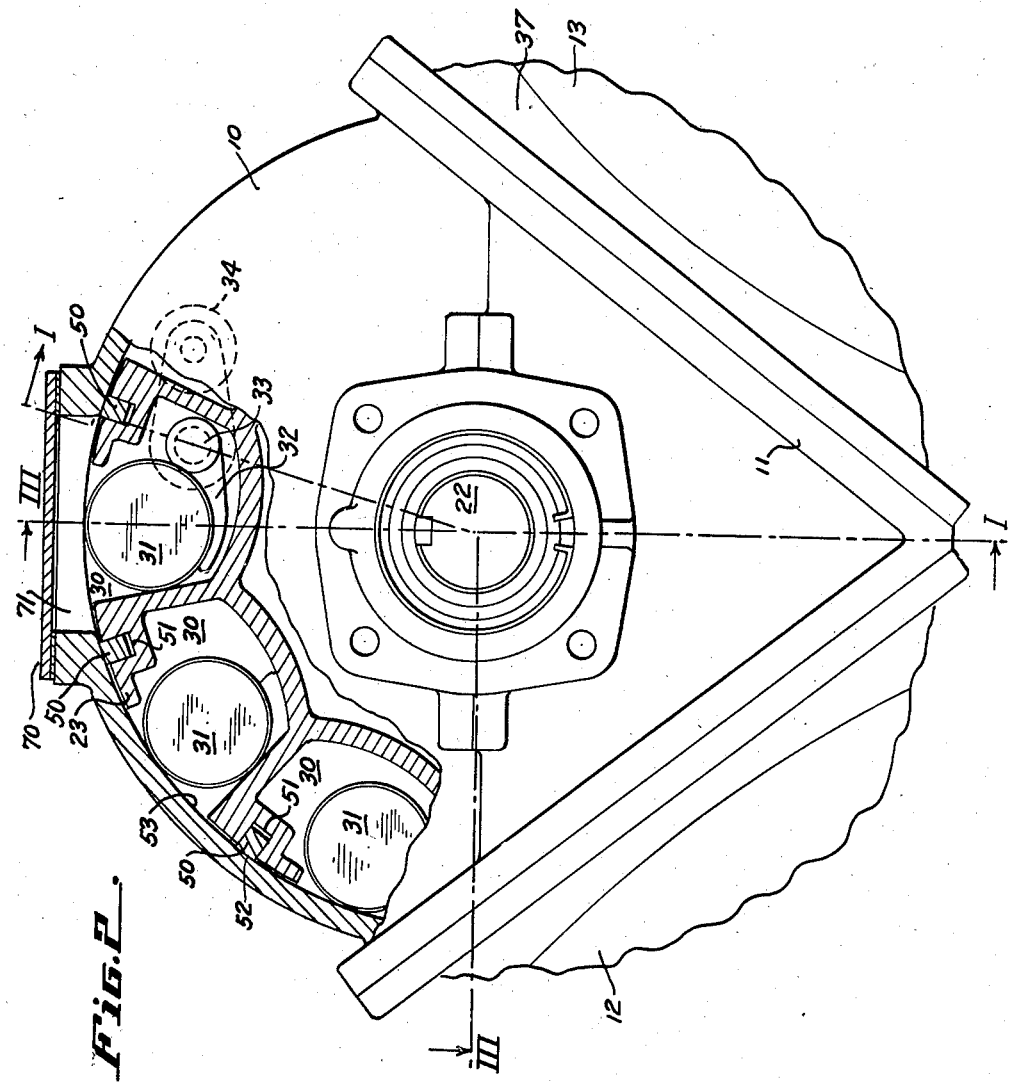

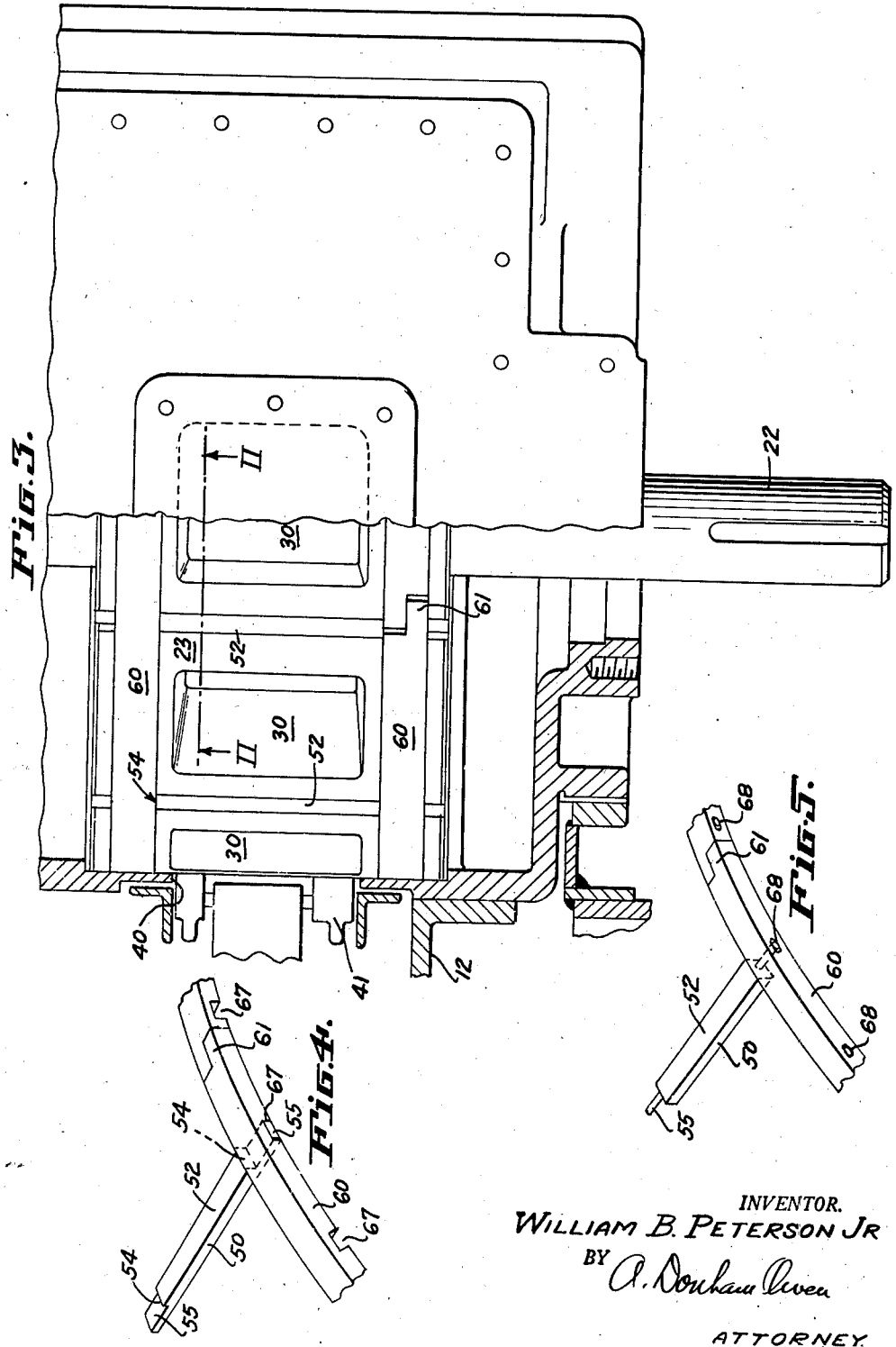

Patented Apr. 24, 1945

2,374,619

UNITED STATES PATENT OFFICE 2,374,619

VALVE FOR PRESSURE CHAMBERS

William B. Peterson, Jr., San Francisco, Calif., assignor to Pacific Can Company, San Francisco, Calif., a corporation of Nevada Application April 24, 1943, Serial No. 484,371

7 Claims. (Cl. 198—211)

My invention relates to improvements in valves.

It is applicable in such machines as a vacuum seamer, a pressure cooker, or any other device where it is desired to pass an object into or withdraw it from a chamber which is being maintained at a different pressure, temperature, etc., than exists outside the chamber or in an adjacent chamber.

The object of my invention is to provide a construction with long life subject to minimum wear, requiring a minimum of power to operate, with parts easily replaceable, and in which the cross-bar sealing members cannot wear any faster than the annular sealing rings, nor get out of alignment with the rings.

Broadly, the improvement lies in the combination of cross-sealing bars having offset extensions which bear on the underside of the annular sealing rings and are offset just enough so the outer face of the bars is flush with the outer face of the sealing rings thus placing outward movement of the sealing bars under control of the sealing rings. This overcomes the wear problem which has long existed in this art and which was caused by cross-bars wearing away the inside face of the cylindrical housing faster than the rings wore it away, thereby causing leaks and requiring replacement of the casing and other expensive parts.

The present invention equalizes the pressure to all the sealing parts where they are in contact with the inner cylindrical wall of the valve housing.

Other objects and advantages of my invention will become apparent from the description of a preferred form as required by statute to illustrate the invention. Because of describing this one form of the device it is not my intention to relinquish claim to other equivalent forms which come within the claims appended at the end hereof.

In the drawings:

Fig. 2 is a vertical plan view of the valve transfer housing looking in the direction of the axis of the rotor shaft, and with part of the housing broken away exposing a portion of the cross-section taken generally on the line II—II of Fig. 3;

Fig. 3 is a plan view of the transfer valve housing with the left-hand portion broken away about on the line III—III of Fig. 2;

Fig. 4 shows a modified form of connection between each cross-bar and sealing ring; and Fig. 5 is a further modification of the same parts.

Figure 1:
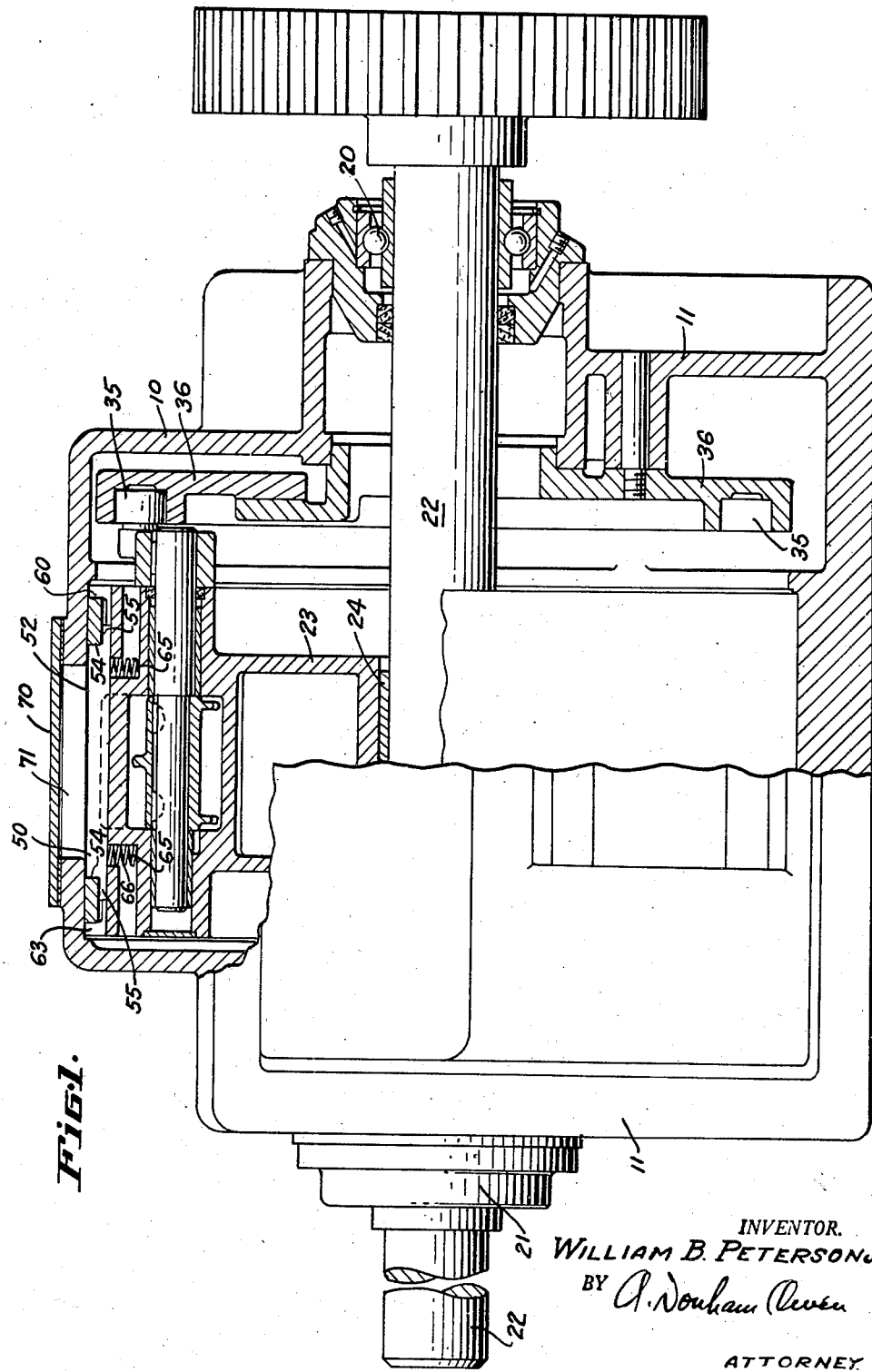
Fig. 1 is a view in elevation, the part in cross-section being taken generally on the line I—I of Fig. 2.

Referring to Fig. 2, the numeral 10 indicates the removable upper case of the valve housing and 11 the V-shaped lower portion. As shown in the drawings for purposes of illustration, the valve is set between a pressure cooker housing 12 on the left and a cooler housing 13 on the right. The valve in housing 11 accomplishes transfer of canned goods from cooker 12 to cooler 13 without permitting communication between housings 12 and 13. It is usual that the pressures and temperatures maintained in housings 12 and 13 are different and it is important that each be so maintained. A similar type of valve is used when first introducing the cans from a conveyer subject to room temperatures and pressures into the other end of cooker 12. The same is true when the cooled cans are taken from the exhaust end of cooler 13.

As noted at the outset this valve is also adapted to use in vacuum seamers and other devices requiring the transfer of a container from one set of pressure or atmospheric conditions into a chamber under a different set of conditions. Valves for accomplishing these transfers are well-known in the art and have long been in use and my invention relates to improvements which overcome a long-existing problem in these devices. Specifically, it has to do with improved means for maintaining a tight seal around the four sides of each transfer pocket.

Mounted in the valve housing 11 (see Fig. 1) in suitable bearings 20, 21 is a driven shaft 22 on which a valve rotor body 23 is keyed at 24.

Valve rotor body 23 has a series of pockets 30 around its periphery of a size adapted to receive cans 31. In the bottom of each pocket an ejecting mechanism 32 is mounted on shaft 33 and controlled by roller 34 which runs in cam groove 35 formed in a web 36 mounted in one end of valve housing 11. Cam 35 is shaped so that ejector finger 32 pushes can 31 out of pocket 30 when it is adjacent the discharging opening 37 in casing 11 in the vicinity of numeral 37 in Fig. 2. Only one ejecting mechanism 32 is illustrated in Fig. 2 so as not to complicate the drawings unnecessarily. It is a well-known device in this art and has no bearing on the present invention.

Cans 31 are received in pockets 30 when they approach inlet opening 40 in housing 11 (see Fig. 3) which is adjacent the end of conveyor 41 on the exhaust end of cooker 12. The pocket 30 lying adjacent opening 40 in casing 11 is in communication with the interior of cooker 12 and while there is subjected to its pressure and temperature as can 31 rolls into it.

The problem is to seal off can 31 in this pocket 30 when rotor 23 carries the can beyond inlet opening 40 and also to prevent any communication between inlet opening 40 and outlet opening 37 in casing 11 into cooler 13.

My invention relates to improvements in means for solving this sealing problem.

Each pocket 30 is sealed from each adjacent pocket by means of sealing bars 50 set loosely in grooves 51 formed in valve body rotor 23 parallel with its axis or shaft 22. Each bar 50 has its peripheral sealing face 52 in yielding contact with the cylindrical inner wall 53 of valve housing 11 and cover 10. At each end these bars 50 have a radial sealing face 54 and an off-set extension 55 in one form or another.

Around valve rotor body 23 extend annular sealing rings 60 with a stepped lap joint shown at 61 in Fig. 3 to permit enlargement and contraction of each ring. Rings 60 are carefully fitted within retaining flanges 63 around the periphery of valve body rotor 23 so that the width of the rings causes them to bear snugly against radial sealing faces 54 on each sealing bar 50.

As shown in Fig. 1, the extensions 55 on sealing bars 50 extend underneath the inner face of rings 60. Here the radial length of sealing faces 54 is made identical with the thickness of sealing rings 60 so that the outer face of the sealing rings 60 and the peripheral face 52 of sealing bars 50 are in perfect cylindrical alignment.

Outward expanding pressure on these sealing parts 50 and 60 may be obtained in any desired way, and whether by springs or by fluid pressure does not matter. As illustrated in Fig. 1 springs 65 are set in recesses 66 beneath each sealing bar 50. The effect of these pressure means 65 is to urge the sealing bars outward radially. The off-set extensions 55 transmit an outward radial pressure to sealing rings 60. Thus, the sealing bars 50 and sealing rings 60 are brought into a sealing sliding contact with the inner cylindrical wall of valve housing and cover 11 and 10. The extensions 55 also serve to limit the outward radial movement of sealing bars 50 so that the sealing periphery 52 of each sealing bar 15 cannot go beyond the sealing face of sealing rings 60. This important feature of the present structure equalizes the wear on the valve housing where it is in sliding contact with sealing bars 50 and rings 60.

In the past, sealing bars 50 have not been controlled radially in relation to sealing rings 60 with the result, first, that the relative rate of wear between the bars and rings was not constant, causing leaks and necessitating frequent replacement of housing 11, 10, as well as the sealing bars 50; and second, that the rate of wear on the cylindrical wall of the valve housing was different in that part in contact with the bars from that part in contact with the rings, necessitating replacement of the whole housing.

In Fig. 4 I have shown a modification in the construction of the sealing ring 60 wherein instead of using a ring of a single thickness throughout its length, slots 67 are cut across the inside face of the ring to receive the off-set extensions 55 on cross-bar sealing members 50. In this construction the remaining thickness of the ring between its outer sealing surface and the grooved inner surface is equal to the thickness of sealing bar 50 along its radial sealing face 54.

In Fig. 5 I have shown another alternative construction in which holes 68 are drilled in sealing rings 60 to receive pins 69 inset in the ends of sealing bars 50. These pins 69 and holes 68 are arranged so that peripheral sealing face 52 of bars 50 and the outer face of rings 60 are flush.

The net result of all of these constructions is to hold sealing bars 50 and sealing rings 60 in a fixed relationship so that their peripheral sealing faces are flush and therefore the frictional pressure exerted on the inner cylindrical wall of the valve housing is equalized. This is especially important when the sealing bars pass over the inlet and outlet openings in the valve housing, for then, as shown in Fig. 1, bar 50 bears on the housing only at its ends, and if uncontrolled would cause excessive wear at these points of the housing as well as on the ends of the bar itself.

The cap 70 covering opening 71 in valve housing cover 10 is a hand-hole or inspection hole for removing damaged cans.

What I claim as my invention is:

1. In a valve, a housing, a multi-pocket valve rotor body having grooves to receive a plurality of individual sealing bars separating adjacent pockets to be sealed and individual sealing rings abutting the ends of said bars, with means slidably connecting said bars to said rings so that outward radial pressure on the sealing bars will not move said bars out of flush sealing relationship with said rings.

2. In a valve, a housing, a multi-pocket valve rotor body having grooves to receive a plurality of individual sealing bars separating adjacent pockets to be sealed and individual sealing rings abutting the ends of said bars, slidable connections between said bars and said rings which lock the bars under the rings so that the sealing faces of the bars and rings will be maintained flush when expanding pressure is applied to said bars.

3. In a valve, a housing, a multi-pocket valve rotor body having grooves to receive a plurality of individual sealing bars separating adjacent pockets to be sealed and individual sealing rings abutting the ends of said bars, slidable connections between said bars and said rings which lock the bars under the rings and means for applying an outward yielding pressure on said bars so that the sealing faces of the bars and rings will be maintained flush.

4. In a pressure transfer valve of the type adapted to transfer materials from one sealed contained to another or from a chamber under atmospheric conditions into a sealed container, in either case, where the pressure or other conditions on either side of the transfer valve are different and this difference would be lost but for the seal maintained in the transfer valve, the combination of a housing having a cylindrical inner wall, bearing supports in the housing ends, an entrance opening and an exit opening spaced apart around the periphery of said wall; a valve rotor body, secured to a shaft mounted in said bearing supports, said body having pockets around its periphery adapted each to receive a container to be transferred, said pockets passing in alignment with the aforesaid entrance and exit openings as the valve body rotates, means for rotating said valve body, and means for sealing the four sides of each pocket with the cylindrical inner wall of said housing, comprising a plurality of sealing bars set in grooves in said valve body parallel with its axis, and having end extensions offset inwardly from the sealing face, annular sealing rings over-lying the end extensions of said bars and in close contact with the radial end face of each bar at said offset, the sealing faces of said bars and said rings being flush, whereby an unbroken seal is maintained on the four sides of each pocket.

5. In a pressure transfer valve mechanism employing a valve rotor body having pockets adapted each to receive a can, a housing, and means to rotate said rotor body, the improvement comprising annular rotor sealing rings fitted in parallel annular channels at each end of said rotor body, individual rotor pocket sealing bars fitted in cross channels cut in said rotor body wall between each adjacent set of can pockets, said channels extending into and beneath said annular channels, whereby the ends of said rotor pocket sealing bars may extend under said annular rotor sealing rings, and means to press said bars outwardly into yielding contact with the inner face of said housing, the extent of said outward movement of said bars being limited by contact of the ends of said bars on the under portion of said annular sealing rings.

6. In a pressure transfer valve mechanism employing a valve rotor body having pockets adapted each to receive a can, a housing, and means to rotate said rotor body, the improvement comprising a plurality of individual sealing bars set in grooves in said valve body parallel with its axis, each bar having a peripheral sealing face for contact with the cylindrical inner wall of said housing, a radial sealing face and an offset extension at each end, annular sealing rings set in annular grooves in said valve body adjacent said pockets, said annular grooves having clearance space in alignment with the bar receiving grooves, whereby the offset extension on the end of each bar will extend under said annular groove in position to bear radially outwardly against the back face of the sealing ring therein, and pressure means urging said bars outward radially, said offset extensions transmitting an outward radial pressure to said sealing rings, said extensions also serving to limit the outward radial movement of said bars to whatever radial outward movement is made by said sealing rings.

7. In a pressure transfer valve mechanism employing a valve rotor body having pockets adapted each to receive a can, a housing, and means to rotate said rotor body, the improvement comprising a plurality of individual sealing bars set in grooves in said valve body parallel with its axis, each bar having a peripheral sealing face for contact with the cylindrical inner wall of said housing, a radial sealing face and an offset extension at each end; annular sealing rings set in annular grooves in said valve rotor adjacent said pockets, said rings having slots on their back sides adapted to receive and bear radially on said bar offset extensions, and pressure means urging said bars outward radially, said offset extensions transmitting an outward radial pressure to said sealing rings, said extension also serving to limit the outward radial movement of said bars to whatever radial outward movement is made by said sealing rings.

WILLIAM B. PETERSON, Jr.